(12) United States Patent
Kanade et al.

(10) Patent No.: US 8,840,746 B2
(45) Date of Patent: Sep. 23, 2014

(54) METHOD OF MANUFACTURING OF SHEETS WITH VARYING CONCENTRATIONS OF PARTICLES

(75) Inventors: Udayan Kanade, Pune (IN); Balaji Ganapathy, Atlanta, GA (US)

(73) Assignee: I2iC Corporation, Foster City, CA (US)

( * ) Notice: Subject to any disclaimer, the term of this patent is extended or adjusted under 35 U.S.C. 154(b) by 0 days.

(21) Appl. No.: 11/754,243

(22) Filed: May 25, 2007

(65) Prior Publication Data
US 2008/0044564 A1 Feb. 21, 2008

(30) Foreign Application Priority Data
May 25, 2006 (IN) .............................. 801/MUM/2006

(51) Int. Cl.
| | | |
|---|---|---|
| B29D 11/00 | (2006.01) | |
| F21V 8/00 | (2006.01) | |
| F21V 7/04 | (2006.01) | |
| B32B 37/12 | (2006.01) | |
| B32B 37/24 | (2006.01) | |

(52) U.S. Cl.
CPC .............. *G02B 6/0065* (2013.01); *B32B 37/12* (2013.01); *B32B 2551/00* (2013.01); *G02B 6/0061* (2013.01); *B32B 37/24* (2013.01); *G02B 6/0041* (2013.01)
USPC ............ 156/242; 264/1.7; 359/599; 362/628; 362/629

(58) Field of Classification Search
USPC ....................... 156/244.25; 362/628, 629, 616
See application file for complete search history.

(56) References Cited

U.S. PATENT DOCUMENTS

| | | | | | |
|---|---|---|---|---|---|
| 2,809,182 | A | * | 10/1957 | Mirr et al. ......................... | 525/11 |
| 3,410,934 | A | * | 11/1968 | Kuritzkes et al. ................ | 264/74 |
| 3,540,964 | A | * | 11/1970 | Nauta ....................... | 156/244.25 |
| 5,612,432 | A | * | 3/1997 | Taniguchi et al. ............ | 526/262 |
| 5,899,552 | A | * | 5/1999 | Yokoyama et al. ........... | 362/619 |
| 5,992,179 | A | * | 11/1999 | Xu et al. ............................ | 65/47 |
| 6,206,535 | B1 | * | 3/2001 | Hattori et al. .................. | 362/616 |
| 6,236,493 | B1 | * | 5/2001 | Schmidt et al. ............... | 359/296 |
| 6,268,961 | B1 | | 7/2001 | Nevitt et al. | |
| 6,663,953 | B2 | | 12/2003 | Kamiya et al. | |
| 2002/0156197 | A1 | | 10/2002 | Kamiya et al. | |
| 2003/0174396 | A1 | * | 9/2003 | Murayama et al. ........... | 359/453 |
| 2004/0111151 | A1 | * | 6/2004 | Paul et al. ..................... | 623/6.37 |
| 2006/0062969 | A1 | * | 3/2006 | Honda ........................... | 428/172 |
| 2006/0083022 | A1 | * | 4/2006 | Pan et al. ...................... | 362/600 |
| 2006/0245212 | A1 | * | 11/2006 | Wei et al. ...................... | 362/615 |

FOREIGN PATENT DOCUMENTS

| | | | | |
|---|---|---|---|---|
| JP | | 02221924 A | * | 9/1990 |
| JP | | 02221926 A | * | 9/1990 |
| WO | PCT/US 07/069822 | | | 3/2008 |

OTHER PUBLICATIONS

Giles, H.F., J.R. Wagner, and E.M. Mount, Extrusion—The Definitive Processing Guide and Handbook, 2005, pp. 372-389.*
Balke, S.T., J. Hu, S. Joseph, A. Karami, and R. Salerni, "Polymer and Particle Separation During Extrusion", ANTEC 1998 Proceedings, Society of Plastics Engineers, 7 pages.*

* cited by examiner

*Primary Examiner* — William Bell

(57) ABSTRACT

An apparatus and method of manufacturing sheets with varying concentrations of particles are described. In one embodiment, a method comprises manufacturing a first sheet having a varying concentration of particles. A second sheet having a second concentration of particles and a first shape with varying thickness is provided. A third sheet having a third concentration of particles and a second shape with varying thickness is provided. The second sheet and the third sheet are merged to generate the first sheet.

17 Claims, 15 Drawing Sheets

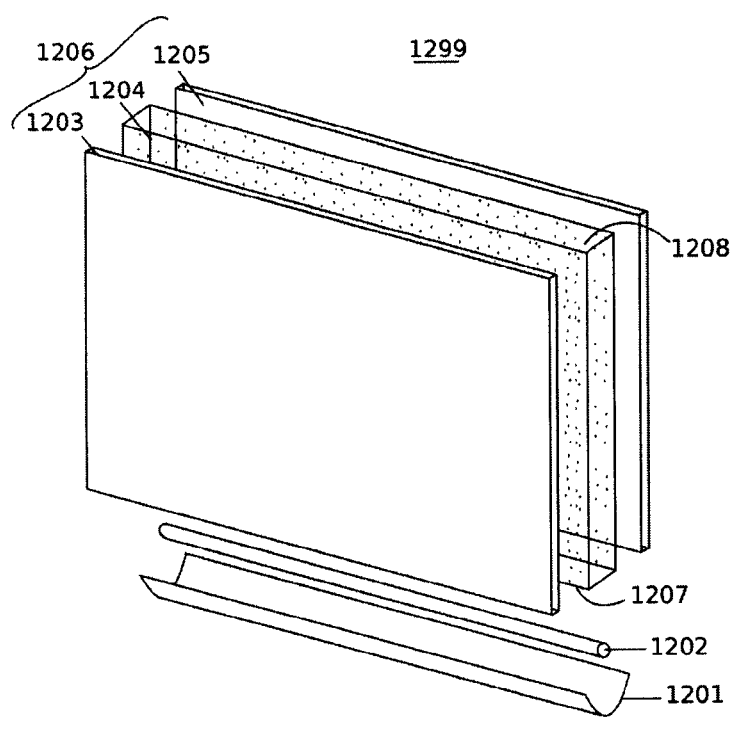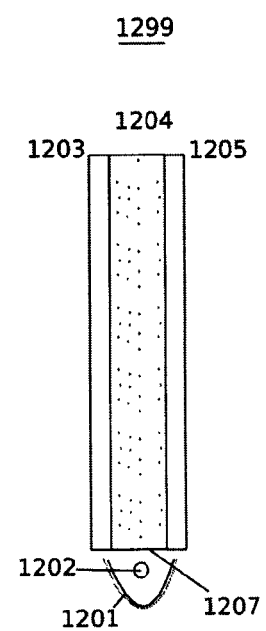
FIG 12A
FIG 12B

METHOD OF MANUFACTURING OF SHEETS WITH VARYING CONCENTRATIONS OF PARTICLES

The present application claims the benefit of and priority to Indian Provisional Patent Application No. 801/MUM/2006 entitled "Method of Manufacturing a Light Source in the Form of a Surface Having a Non-Uniform Distribution of Light Extracting Particles" and filed on May 25, 2006.

FIELD

The present invention relates to materials. More particularly, it relates to a method of manufacturing of sheets with varying concentrations of particles.

BACKGROUND

Sheets of a first material with particles of a second material embedded within them are used for various purposes. Such particles may cause a change in certain properties of the sheet such as strength, brittleness, heat resistance, etc. that are beneficial for various purposes. Sheets with particles are also used for optical purposes. For example, a transparent sheet may have particles of a different refractive index embedded in it. The transparent sheet acts as a light guide, and the embedded particles disperse the guided light. This apparatus can be used as a light source. The particles may be dyes added to impart color to the sheet. Sheets with a constant concentration of particles are used where the concentration of particles is not a constant, but varies throughout the sheet.

One use of a sheet with a varying concentration of particles is for a light source with a particular light emanation pattern. Various light emanation patterns can be achieved by employing various concentration profiles of the particles. The particle concentration along the sheet can be adjusted to provide a uniform extraction of light from the sheet, or light extraction in any required pattern. Such light sources find many uses in the art, including as backlights for LCD displays, as light sources of photography and as architectural light sources. Sheets with varying concentration of particles are also used for artistic purposes, and for road signs, material sciences, and optics.

SUMMARY

A method for manufacturing a sheet with a varying concentration of particles is disclosed. In one embodiment, a method comprises manufacturing a first sheet having a varying concentration of particles. A second sheet having a second concentration of particles and a first shape with varying thickness is provided. A third sheet having a third concentration of particles and a second shape with varying thickness is provided. The second sheet and the third sheet are merged to generate the first sheet.

The above and other preferred features, including various details of implementation and combination of elements are more particularly described with reference to the accompanying drawings and pointed out in the claims. It will be understood that the particular methods and systems described herein are shown by way of illustrations only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below service to explain and teach the principles of the present invention.

FIG. 12A illustrates a block diagram of an exemplary transparent light source.

FIG. 12B illustrates a block diagram of an exemplary transparent light source as viewed from the side, according to one embodiment.

DETAILED DESCRIPTION

A method and apparatus for manufacturing a sheet with a varying concentration of particles is disclosed. In one embodiment, a method comprises manufacturing a first sheet having a varying concentration of particles. A second sheet having a second concentration of particles and a first shape with varying thickness is provided. A third sheet having a third concentration of particles and a second shape with varying thickness is provided. The second sheet and the third sheet are merged to generate the first sheet.

Figure 1:
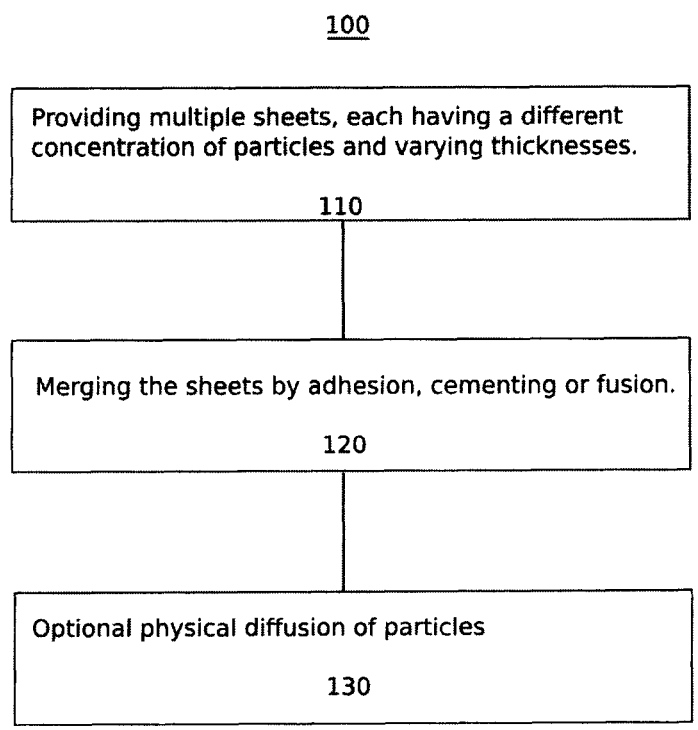
FIG. 1 is a flow diagram illustrating an exemplary process of manufacturing a sheet with a varying concentration of particles, according to one embodiment.

FIG. 1 is a flow diagram illustrating an exemplary process 100 of manufacturing a sheet with a varying concentration of particles, according to one embodiment. A number of sheets are provided (110) where each sheet has a different concentration of particles. Any one of these concentrations could be a zero concentration, i.e. one wherein there are no particles. The thicknesses of the sheets are not constant, but are set to different thicknesses in different parts of the sheets. These sheets are merged together by adhesion, cementing or fusion (120). The merging of the sheets produce a sheet of the required dimensions, and in every part of the sheet, a local concentration of particles is obtained, as desired.

In one embodiment, the fusion of the sheets is achieved by merging the sheets while they are in a liquid state. The merged sheet then solidifies into the final sheet with a varying concentration of particles. The liquid state may occur by maintaining a certain temperature for the process, wherein the solidification is carried out by cooling. The liquid state may be a monomer or a partially polymerized state, wherein the solidification is carried out by polymerization. The liquid state of the sheets may be a viscous liquid state, such as that of various molten thermoplastics, or that of advanced but incomplete polymerization. The merging sheets may be in different states of viscosity, which may be achieved by different temperatures, or different states of polymerization. For example, one of the merging sheets may be a liquid, and the other sheet may be a viscous liquid or completely solidified object.

In an alternate embodiment, the merging process includes the physical diffusion of particles from one sheet into other sheets (130). This diffusion process reduces the original difference in particle concentrations in the sheets being merged. The amount of diffusion is controlled such that a required concentration profile of the particles is achieved in the final sheet. The amount of diffusion may be controlled by controlling the rate of diffusion and the time of diffusion. The rate of diffusion is controlled by controlling the temperature and the viscosity.

Figure 2:
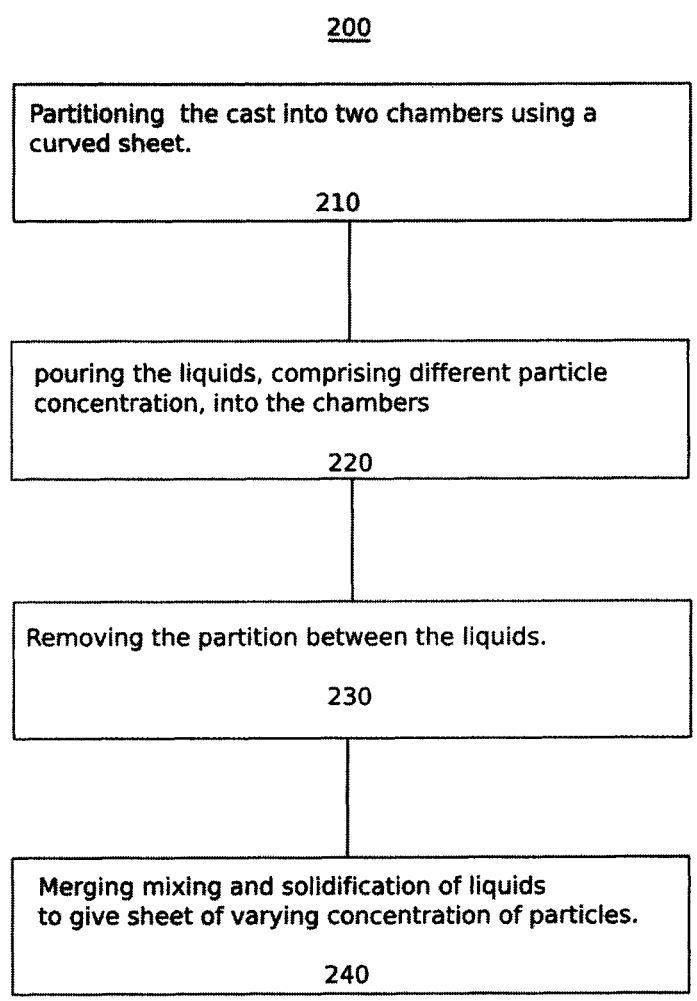
FIG. 2 is a flow diagram illustrating an exemplary process of manufacturing a sheet with a varying concentration of particles, according to one embodiment.

FIG. 2 is a flow diagram illustrating an exemplary process 200 of manufacturing a sheet with a varying concentration of particles, according to one embodiment. A cast is partitioned into two chambers using a curved sheet (210). A liquid containing within it a certain particle concentration is poured into one chamber of the cast (220). In the second chamber of the cast, a liquid having a different particle concentration is poured. The curved surface is removed at a predefined time or when the liquids attain a predefined viscous state (230). In another embodiment, the liquids act as solvents and dissolve the curved surface. The liquids merge, mix and eventually solidify to give a solid of varying concentration of particles (240). Solidification is achieved by cooling the liquid, or by polymerization, or by any similar physical or chemical process. The solidification process uses a controlled temperature or polymerization schedule, or other process such that the rate of physical diffusion of the particles in the liquid is controlled as a function of time. It is possible that the particles also undergo physical and chemical change during the process. During solidification, the particles undergo migration due to physical diffusion and in alternate embodiments, due to buoyant force, convection, non-uniform diffusion rates, and other forces.

Figure 3A:
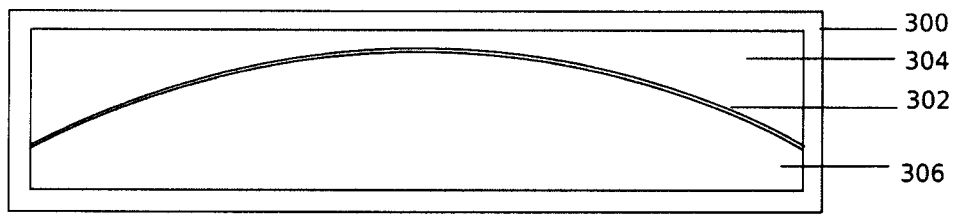
FIG. 3A illustrates a block diagram of an apparatus for manufacturing a sheet, according to one embodiment.

FIG. 3A illustrates a block diagram of an apparatus 398 for manufacturing a sheet, according to an embodiment. The apparatus 398 has a cast 300 and a curved surface 302, with a predefined shape, which partitions the cast 300 into two chambers 304 and 306. The curved shape is designed so as to get the required profile of particle concentration at the end of the manufacturing process, such as process 200.

Figure 3B:
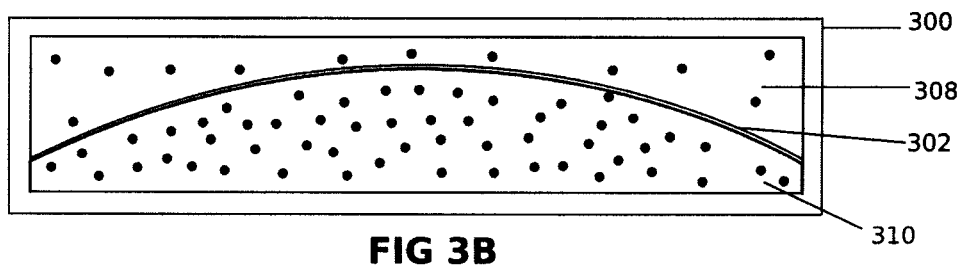
FIG. 3B illustrates a block diagram of an apparatus for manufacturing a sheet, according to one embodiment.

FIG. 3B illustrates a block diagram of an apparatus 396 for manufacturing a sheet with liquids, according to an embodiment. The top chamber is filled with liquid 308 having a particular particle concentration. The lower chamber is filled with liquid 310 having a different concentration of particles. Any one of these concentrations could be a zero concentration, i.e. one wherein there are no particles. According to one embodiment, the curved surface 302 is manufactured by solidification of the same liquid as 308 or 310. This allows the curved surface 302 to dissolve into the liquid material.

The liquids 308 and 310 start solidifying and become more viscous. The curved surface 302 is removed at a predefined time or when the liquid attains a predefined viscous state. In an embodiment, the curved surface 302 is removed mechanically. In another embodiment, the liquid acts as a solvent and dissolves and hence removes the curved surface 302. The dissolution of curved surface 302 may be achieved by heating the liquid.

Figure 3C:
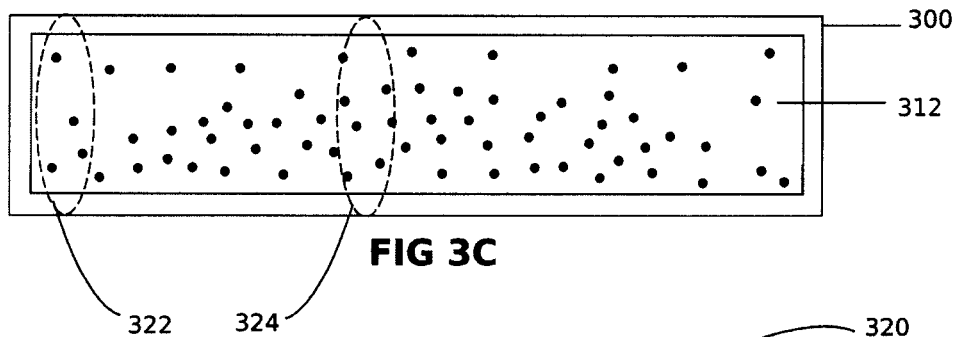
FIG. 3C illustrates a block diagram of an apparatus according to one embodiment.

FIG. 3C illustrates a block diagram of an apparatus 394 for manufacturing in a sheet without a curved surface 302, according to an embodiment. The liquids 308 and 310 start solidifying and become more viscous. The curved surface 302 is removed at a predefined time or when the liquids attain a predefined viscous state. In an embodiment, the curved surface 302 is removed mechanically. In another embodiment, the liquids act as a solvent and dissolve and hence remove the curved surface 302. The dissolution of curved surface 302 may be achieved by heating the liquids.

After the removal of the curved surface 302, the resulting body 312 has a varying concentration of particles in it. For example, the average concentration of particles in an area 322 is different from the average concentration of particles in an area 324. This is so because the proportion of the two bodies 308 and 310 are different in these two areas. In an embodiment, the body 312 is solidified in this form to form a sheet with a varying concentration of particles. In another embodiment, diffusion of the bodies 308 and 310 is performed, as explained below.

Figure 3D:
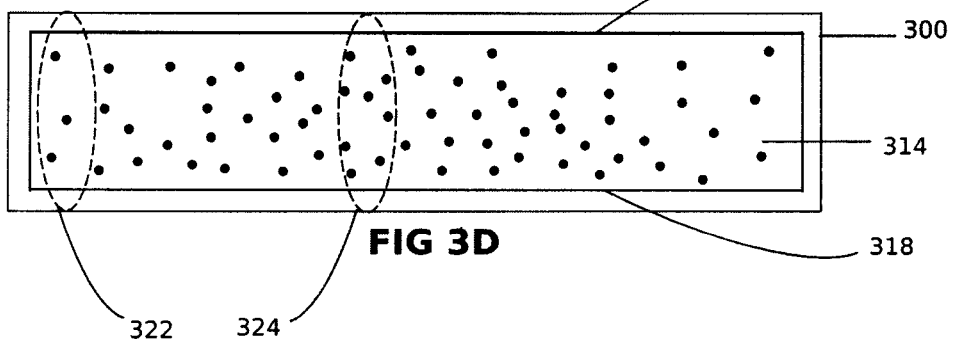
FIG. 3D illustrates a block diagram of an apparatus according to one embodiment.

FIG. 3D illustrates a block diagram of an apparatus 392 for manufacturing a sheet with diffusion, according to an embodiment. The liquids 308 and 310 solidify to give a sheet 314 having the required particle concentration profile. In an embodiment, the solidification is done by polymerization or by cooling of the liquid. In one embodiment, the liquid is a plastic monomer which is then polymerized.

In an embodiment, during the process of solidification, the particles undergo physical diffusion into the liquid body 312 before it solidifies, to form a sheet 314 having a gradation in the particle concentration having a predetermined concentration pattern. Such a diffusion causes a local homogenization of particle concentrations. For example, vertical concentration gradient in the body 314 at the local area 324 is less than the vertical concentration gradient in the body 312 at the same area 324. Similarly, the vertical concentration gradient in the body 314 at the local area 322 is less than the vertical concentration gradient in the body 312 at the same area 322. The amount of diffusion is controlled by controlling the rate and time of diffusion. The diffusion is enough to cause the local homogenization of particle concentrations, without being so strong as to completely homogenize the particle concentrations over the whole sheet 314.

When particles undergo physical diffusion, the curved surface 302 is designed as follows. The physical diffusion process is approximated as a linear, location invariant system, namely a convolution operation. The initial concentration pattern is arranged such that after the physical diffusion process, the final concentration pattern is the required concentration pattern. This may be done by deconvolution. This initial concentration pattern is then effected using the curved surface 302. The initial concentration at any point in the cast 300 is a weighted average of the concentration in the liquid 308 and the liquid 310, weighted by the distances of the curved surface 302 at that point from the cast boundaries 320 and 318. According to one embodiment, the impulse response of the convolution operation, necessary to perform the deconvolution, is identified experimentally, or by using the knowledge of the temperature schedule, or other controlled solidification process used. Because of non location-invariance at the edges, a linear but not location invariant model may be used in another embodiment. The initial particle concentration pattern is then calculated using linear system solution methods, including matrix inversion or the least squares method.

Figure 4:
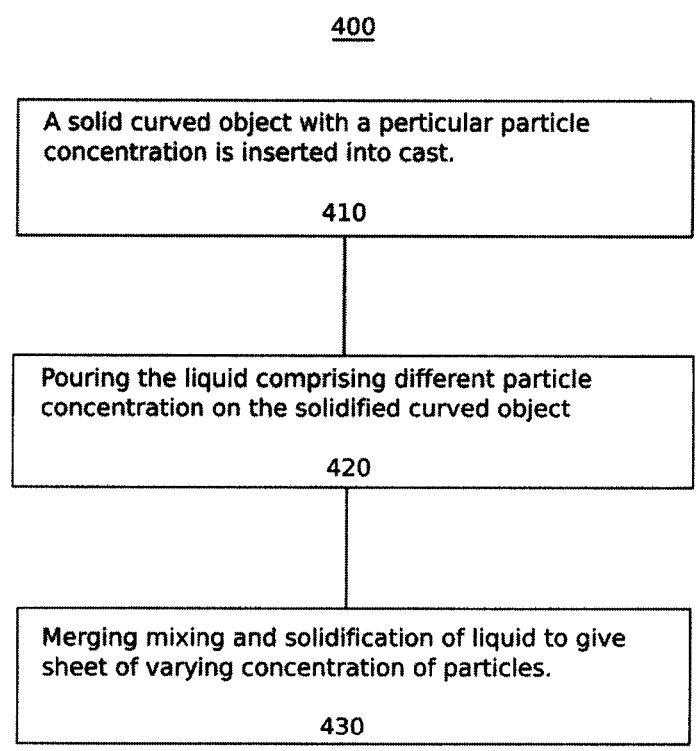
FIG. 4 is a flow diagram illustrating an exemplary process of manufacturing a sheet with a varying concentration of particles, according to one embodiment.

FIG. 4 is a flow diagram illustrating an exemplary process 400 of manufacturing a sheet with a varying concentration of particles, according to one embodiment. A curved object having a particular concentration of particles is inserted in a container (410). The curved object may be manufactured by processes such as casting, injection molding, mold polymerization, machining, etc. Processes such as casting, injection molding and mold polymerization may be performed in the container itself, so that the formed curved object is already present in the container. A liquid having a particular particle concentration is poured onto the curved object (420). The liquid merges and mixes with the curved object, and eventually solidifies (430). In an embodiment, the curved object diffuses into the liquid before complete solidification of the liquid. The diffusion may be caused by the curved object partially or completely dissolving in the liquid. This dissolution may be caused by heat, or by physical dissolution of the solid in the liquid. The liquid eventually solidifies to give a solid sheet with a varying concentration of particles. Solidification is achieved by cooling the liquid, or by polymerization, or by other physical or chemical means. The solidification process uses a controlled temperature or polymerization schedule, or other process such that the rate of physical diffusion of the solid in the liquid is controlled as a function of time. It is possible that the particles undergo physical and chemical change during the process. During solidification, the particles undergo migration due to physical diffusion and in alternate embodiments, due to buoyant force, convection, non-uniform diffusion rates, and other forces.

Figure 5A:
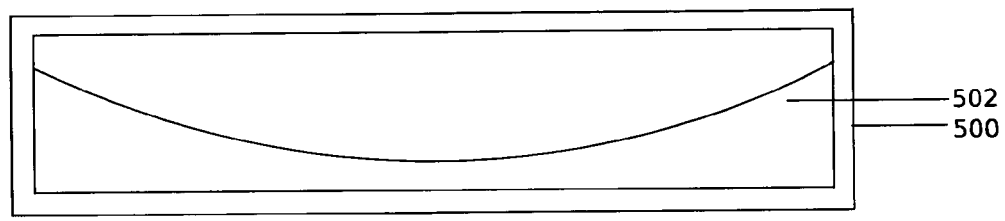
FIG. 5A illustrates a block diagram of an apparatus according to one embodiment.

FIG. 5A illustrates a block diagram of an apparatus 598 for manufacturing a sheet, according to an embodiment. A curved object 502 having a particular concentration of particles is inserted in a container 500. The shape of curved object 502 is designed for a required particle concentration profile at the end of the manufacturing process. The curved object 502 along with the container 500 now acts as a cast in the manufacturing process.

Figure 5B:
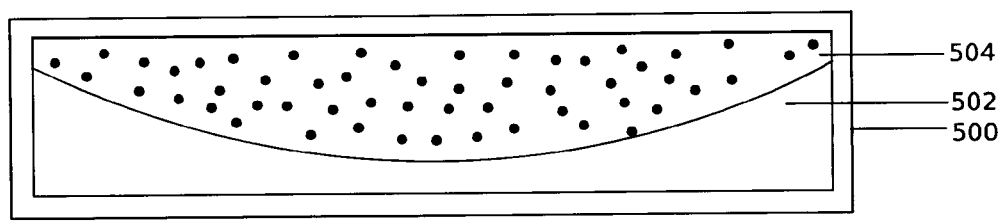
FIG. 5B illustrates a block diagram of an apparatus according to one embodiment.

FIG. 5B illustrates a block diagram of an apparatus 596 for manufacturing a sheet with liquids, according to an embodiment. A liquid 504 with a particular particle concentration is poured in the cast formed by container 500 and curved object 502. The concentration of particles in liquid 504 is different than the concentration of particles in curved object 502.

Figure 5C:
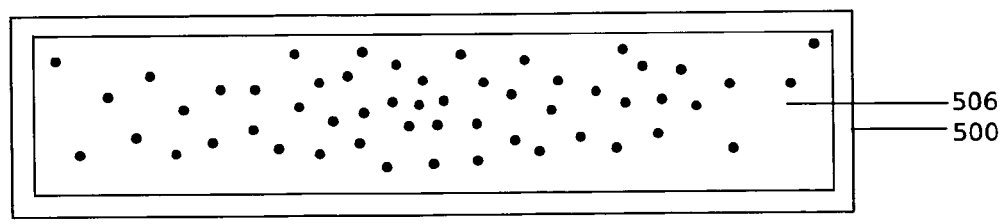
FIG. 5C illustrates a block diagram of an apparatus according to one embodiment.

FIG. 5C illustrates a block diagram of an apparatus 594 for manufacturing a sheet, according to one embodiment. The liquid 504 solidifies to render a sheet 506 having the required particle concentration profile. In an embodiment, the solidification is done by polymerization or by cooling of the liquid. In one embodiment, the liquid is a plastic monomer which is then polymerized.

According to an embodiment, curved object 502 diffuses into the liquid 504, before complete solidification of the liquid 504. The diffusion may be caused by the curved object 502 partially or completely dissolving in liquid 504. Liquid 504 may be heated to cause this dissolution.

Figure 6A:
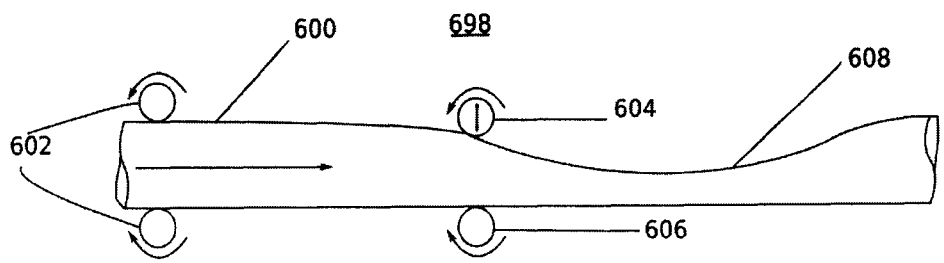
FIG. 6A illustrates a block diagram of an exemplary continuous process of manufacturing a corrugated sheet, according to one embodiment.

FIG. 6A illustrates a block diagram of an exemplary sheet manufacturing device 698, according to one embodiment. A molten sheet 600 has a particular concentration of particles. sheet 600 is passed through a moving pair of feeder rollers 602. These rollers 602 feed the sheet 600 through pinch roller 604 and guide roller 606. The pinch roller 604 moves up and down according to a predefined function of time. This movement of pinch roller produces a corrugated sheet 608. The movement of rollers is defined according to the pattern of corrugations required.

The device 698 for manufacturing a corrugated sheet may be used to manufacture a curved. The curved sheet is produced by cutting the corrugated sheet. Alternately, the corrugated sheet 608 is merged with other corrugated sheets in a continuous process, as described below. The corrugation pattern of sheet 608 is designed so as to get the required profile of particle concentration at the end of the manufacturing process.

Figure 6B:
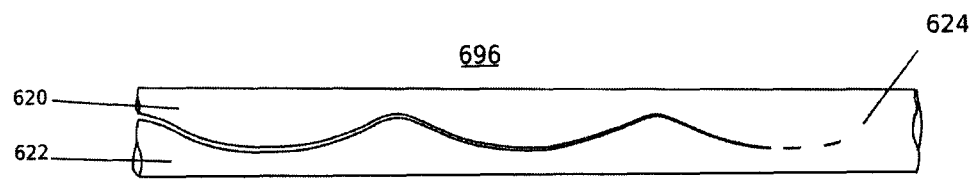
FIG. 6B illustrates a block diagram of an exemplary continuous process of manufacturing a sheet with a varying concentration of particles, according to one embodiment.

FIG. 6B illustrates a block diagram of an exemplary sheet manufacturing device 696, according to one embodiment. A corrugated sheet 620 of a particular particle concentration is merged with a matching corrugated sheet 622 with a different particle concentration to give a merged sheet 624 with a varying concentration of particles. Sheets 620 and 622 are manufactured with the process 698 using different corrugation patterns. According to an embodiment, the two sheets are in a molten state during the merging process, and fuse together due to heat. Such fusion may include diffusion of the particles from each sheet into the other. Diffusion may also be achieved by dissolution using a solvent. In an alternate embodiment the corrugated sheets are cemented by adhesive material.

The sheet 624 has a continuously varying concentration of particles. This sheet may be cut into smaller pieces.

Figure 6C:
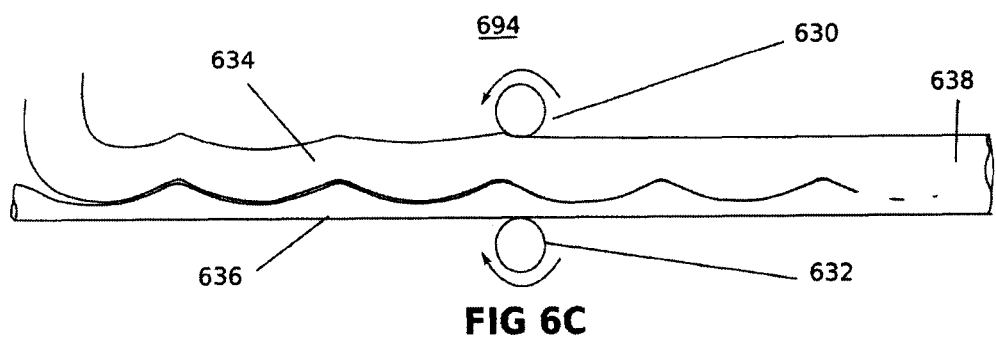
FIG. 6C illustrates a block diagram of a continuous process of manufacturing a sheet with a varying concentration of particles according to one embodiment.

FIG. 6C illustrates a block diagram of a sheet manufacturing device 694, according to one embodiment. A corrugated sheet 636 of a particular particle concentration is merged with liquid 634 having a different particle concentration to give a merged sheet 638 with varying concentration of particles. According to an embodiment, the sheet 636 and liquid 634 fuse together due to heat. Such fusion may include diffusion of the particles from each sheet into the other. The roller 630 removes undulations, and makes the surface of sheet 638 flat. The roller 632 acts as a guide for the sheet 636. The sheet 638 has a continuously varying concentration of particles. This sheet may be cut into smaller pieces.

Figure 7A:
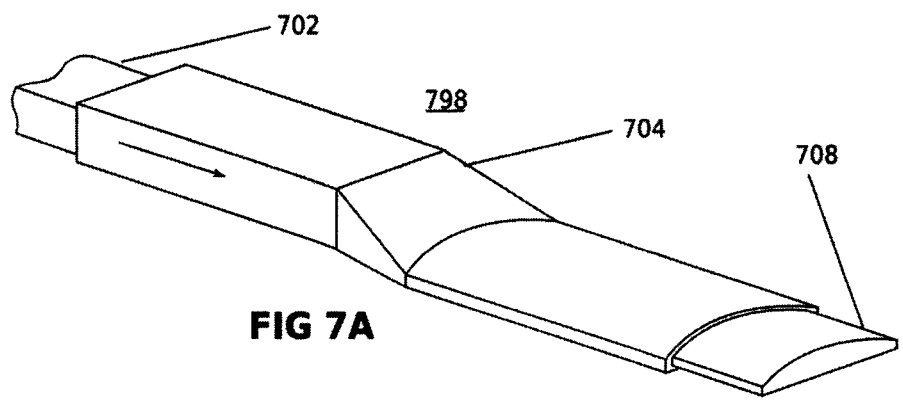
FIG. 7A illustrates a block diagram of an exemplary continuous process of manufacturing a curved sheet, according to one embodiment.

FIG. 7A illustrates a block diagram of an exemplary curved sheet manufacturing device 798, according to an embodiment. A molten sheet 702 is pushed through a dome shaped hole 704. In an embodiment, the sheet 702 is a sheet of molten plastic. A curved sheet 708 is squeezed out from the other end of the dome shaped hole 704. In one embodiment, the area of cross section of plastic sheet 702 and that of the curved sheet 708 is same.

The process 798 of manufacturing a curved sheet may be used to manufacture a curved sheet. Alternately, the curved sheet 708 is merged with other curved sheets in a continuous process, as described below. The curve of the dome shaped hole 704 is designed so as to render the required profile of particle concentration at the end of the manufacturing process.

Figure 7B:
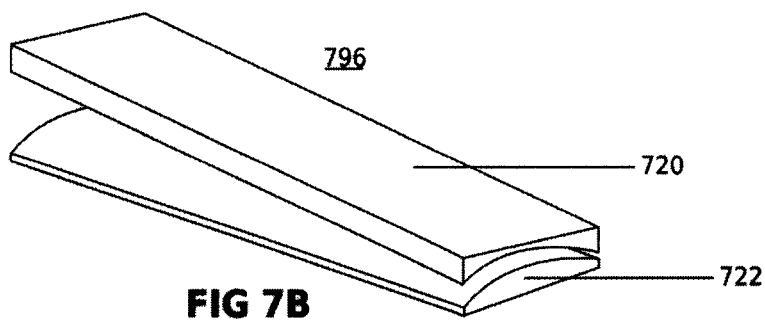
FIG. 7B illustrates a block diagram of a continuous process of manufacturing a sheet with a varying concentration of particles, according to one embodiment.

FIG. 7B illustrates a block diagram of a sheet manufacturing device 796, according to one embodiment. A curved sheet 722 comprising a particular particle concentration is merged with a matching sheet 720 with a different particle concentration to give a single sheet with a varying concentration of particles. Sheets 720 and 722 are manufactured with the manufacturing device 798 using different dome shaped holes. According to an embodiment, the two sheets are in a molten state during the merging process, and fuse together due to heat. Such fusion may include diffusion of the particles from each sheet into the other. In an alternate embodiment the curved sheets are cemented by adhesive material. The merged sheet has a continuously varying concentration of particles. This sheet may be cut into smaller pieces.

Figure 7C:
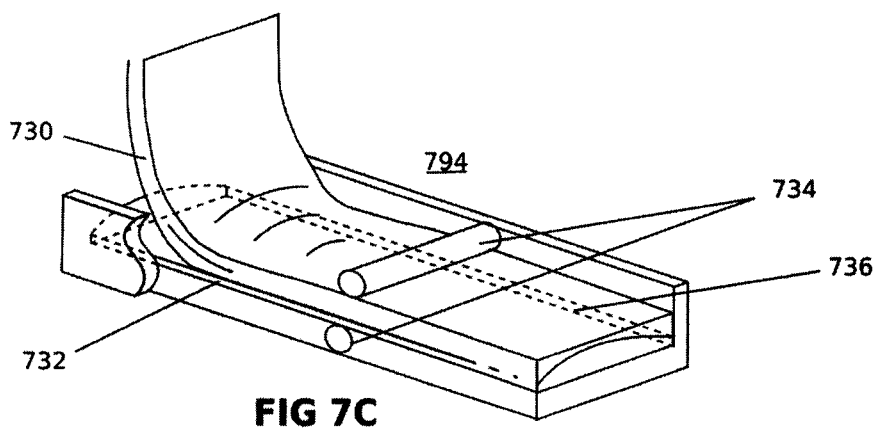
FIG. 7C illustrates a block diagram of a continuous process of manufacturing a sheet with a varying concentration of particles, according to one embodiment.

FIG. 7C illustrates a block diagram of a sheet manufacturing device 794, according to one embodiment. A curved sheet 732 has a particular particle concentration and is merged with liquid 730 having a different particle concentration to provide a merged sheet 736 with varying concentration of particles. According to an embodiment, the sheet 732 and liquid 730 fuse together due to heat. Such fusion may include diffusion of the particles from each sheet into the other. The rollers 734 removes undulations, and makes the surface of sheet 736 flat. The sheet 736 has a continuously varying concentration of particles. This sheet may be cut into smaller pieces.

Figure 8:
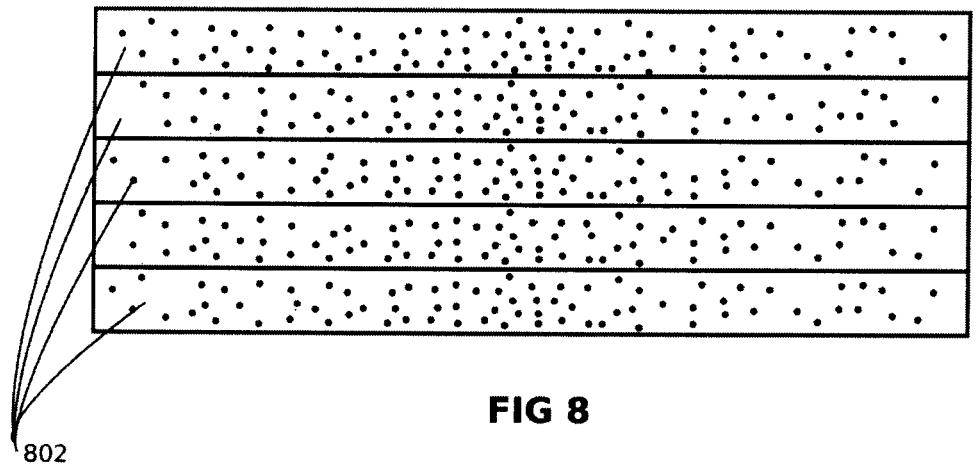
FIG. 8 illustrates a block diagram of an exemplary process of manufacturing a sheet with a varying concentration of particles, according to one embodiment.

FIG. 8 illustrates a block diagram of exemplary sheets 898 with a varying concentration of particles, according to one embodiment. Multiple thin sheets 802 with varying concentration of particles are stacked having a defined concentration profile. Each sheet of 802 can be manufactured through any of the processes described herein. According to an embodiment, the sheets 802 are in a molten state during the merging process, and fuse together due to heat. Such fusion may include diffusion of the particles from each sheet into the other. In an alternate embodiment the sheets 802 are cemented together by adhesive material.

In an embodiment, during the process of diffusion, the particles in the sheets undergo physical diffusion from each sheet into the other. This causes minimal changes to the gradation in the particle concentration. In this embodiment, the sheets 802 are designed as follows. The physical diffusion process is approximated as a linear, location invariant system, namely a convolution operation. The initial concentration pattern in each sheet 802 is defined such that after the physical diffusion process, the final concentration pattern is the required concentration pattern. This may be done by deconvolution. According to one embodiment, the impulse response of the convolution operation, necessary to perform the deconvolution, is identified experimentally, or using the knowledge of the temperature schedule, or other controlled solidification process used. Because of non location-invariance at the edges, a linear but not location invariant model may be used in another embodiment. The initial particle concentration pattern in each sheet of 802 is then calculated using linear system solution methods, including matrix inversion or the least squares method.

Figure 9:
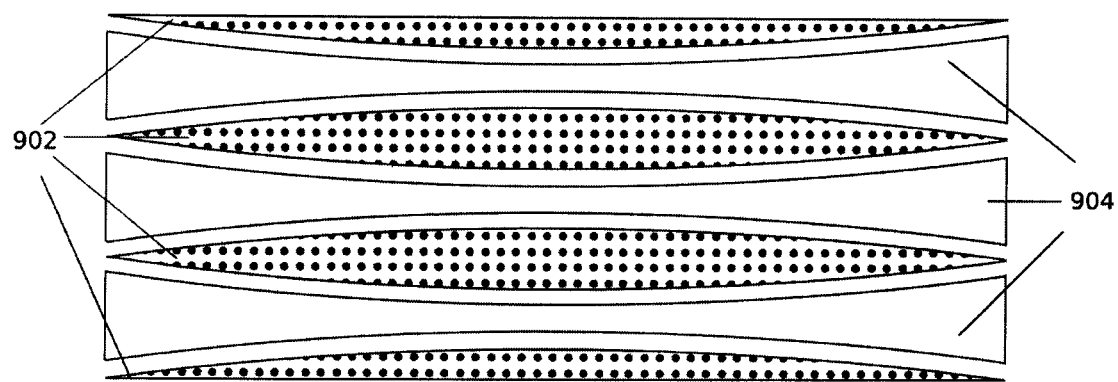
FIG. 9 illustrates a block diagram of an exemplary process of manufacturing a sheet with a varying concentration of particles by merging sheets having variable thickness and different concentrations of particles, according to one embodiment.

FIG. 9 illustrates a block diagram of an exemplary sheet 998 of sheets merged having variable thickness and different concentrations of particles, according to one embodiment.

Sheets 902 and 904, have variable thicknesses and different particle concentrations in each sheet. In an embodiment, the manufacturing process illustrated in block diagrams 599 or 699 is used for manufacturing variable thickness sheets 902 and 904. In an embodiment, these layers are bound together by cementing material. According to an embodiment, the sheets 902 and 904 are in a molten state during the merging process, and fuse together due to heat. Such fusion may include diffusion of the particles from each sheet into the other. Local diffusion of particles that occurs between the sheets is enough for welding the sheets. The variable thicknesses of the sheets are designed so as to get the required profile of concentration at the end of the manufacturing process.

Columns with Varying Concentration of Particles

Figure 10:
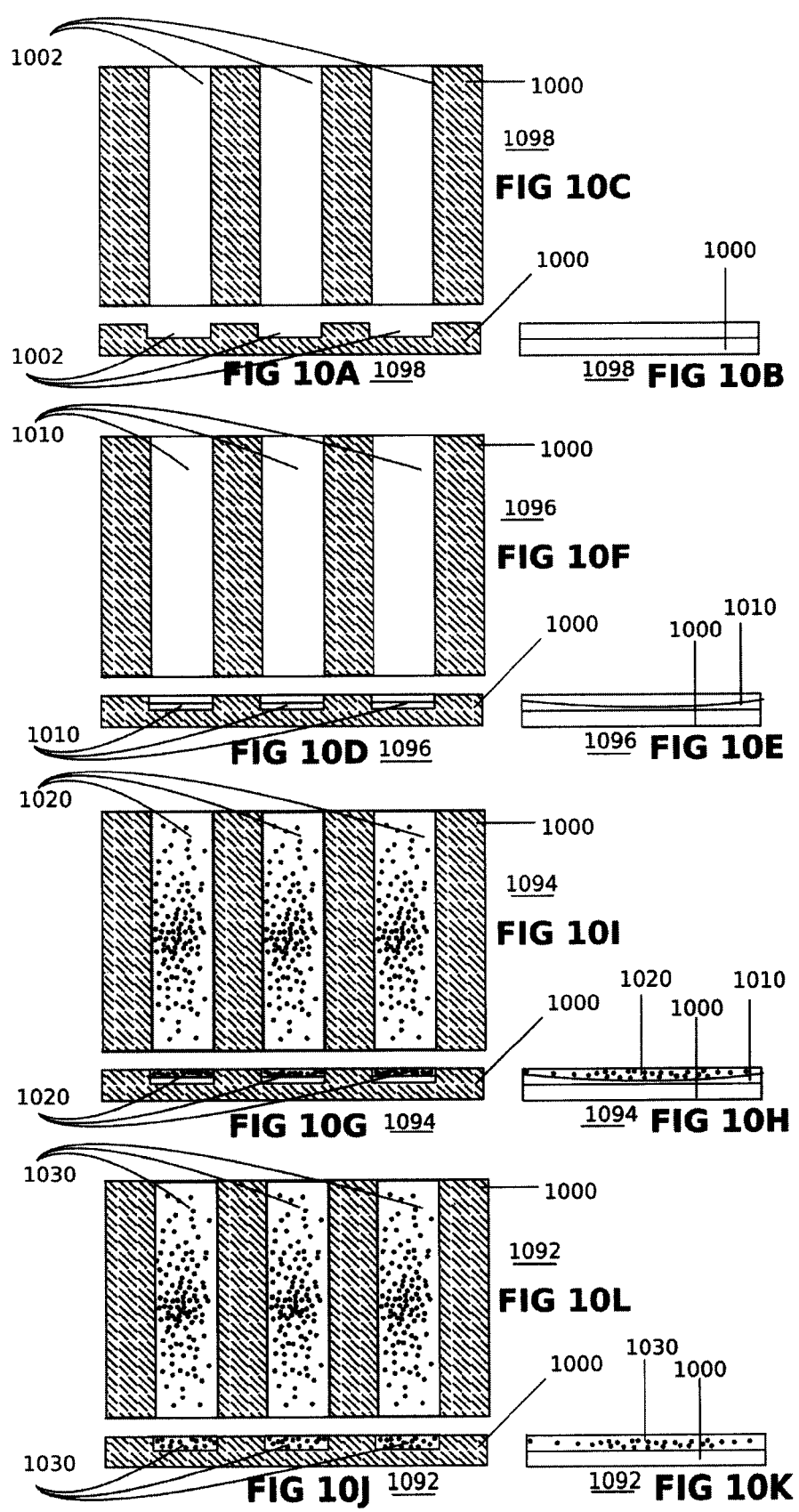
FIG. 10A illustrates a step in the method of manufacturing columns with varying concentration of particles as viewed from the front, according to an embodiment. [Revise]
FIG. 10B illustrates a step in the method of manufacturing columns with varying concentration of particles as viewed from the side, according to an embodiment.
FIG. 10C illustrates a step in the method of manufacturing columns with varying concentration of particles as viewed from the top, according to an embodiment.
FIG. 10D illustrates a step in the method of manufacturing columns with varying concentration of particles as viewed from the front, according to an embodiment.
FIG. 10E illustrates a step in the method of manufacturing columns with varying concentration of particles as viewed from the side, according to an embodiment.
FIG. 10F illustrates a step in the method of manufacturing columns with varying concentration of particles as viewed from the top, according to an embodiment.
FIG. 10G illustrates a step in the method of manufacturing columns with varying concentration of particles as viewed from the front, according to an embodiment.
FIG. 10H illustrates a step in the method of manufacturing columns with varying concentration of particles as viewed from the side, according to one embodiment.
FIG. 10I illustrates a step in the method of manufacturing columns with varying concentration of particles as viewed from the top, according to one embodiment.
FIG. 10J illustrates a step in the method of manufacturing columns with varying concentration of particles as viewed from the front, according to one embodiment.
FIG. 10K illustrates a step in the method of manufacturing columns with varying concentration of particles as viewed from the side, according to one embodiment.
FIG. 10L illustrates a step in the method of manufacturing columns with varying concentration of particles as viewed from the top, according to one embodiment.

FIG. 10A illustrates a column manufacturing device 1098 as viewed from the front, according to an embodiment. A cast 1000 with channels 1002 is provided. Columns with varying concentration of particles are manufactured in channels 1002.

In one embodiment, the cast 1000 and the columns are both made of transparent material. The columns produced are not removed from the transparent cast 1000.

FIG. 10B illustrates a column manufacturing device 1098 as viewed from the side, according to one embodiment. In one embodiment, the cast 1000 and the columns are both made of transparent material. The columns produced are not removed from the transparent cast 1000.

FIG. 10C illustrates a column manufacturing device 1098 as viewed from the top, according to one embodiment. A cast 1000 with channels 1002 is provided. Columns with varying concentration of particles are manufactured in channels 1002.

FIG. 10D illustrates a column manufacturing device 1096 as viewed from the front, according to one embodiment. Liquid with a particular concentration of particles is poured into the channels 1002 of the cast 1000 and is solidified in such a way that it attains different thickness along the length of the channel 1002, giving a varying thickness column shaped solid 1010 with a particular concentration of particles. The variation in the thickness may be achieved by using an insert block in the casting process. The thickness is varied so as to get the required profile of particle concentration at the end of the manufacturing process.

FIG. 10E illustrates an exemplary column manufacturing device 1096 as viewed from the side having a cast 1000 filled with solid 1010, according to an embodiment. The thickness of solid 1010 is varied so as to get the required profile of particle concentration at the end of the manufacturing process.

FIG. 10F illustrates an exemplary column manufacturing device 1096 as viewed from the top filled having a cast 1000 with solid 1010, according to an embodiment. The thickness of solid 1010 is varied so as to get the required profile of particle concentration at the end of the manufacturing process.

FIG. 10G illustrates a column manufacturing device 1094 with liquid 1020 as viewed from the front, according to an embodiment. The varying thickness column shaped solid 1010 acts as a cast, and liquid 1020 with a different particle concentration is poured into this cast. In an embodiment, liquid 1020 is solidified in its present shape. In another embodiment, the liquid 1020 diffuses into solid 1010.

FIG. 10H illustrates an exemplary column manufacturing device 1094 having a cast 1000 with liquid 1020 as viewed from the side, according to one embodiment. The thickness of solid 1010 is varied so as to get the required profile of particle concentration at the end of the manufacturing process. Liquid 1020 conforms to the shape of solid 1010 within cast 1000.

FIG. 10I illustrates an exemplary column manufacturing device 1094 having a cast 1000 with liquid 1020 as viewed from the top, according to one embodiment.

FIG. 10J illustrates an exemplary column manufacturing device 1092 with columns 1030 as viewed from the front, according to one embodiment. The varying thickness column shaped solid 1010 and liquid 1020 fuse together due to heat. Such fusion may include diffusion of the particles into each other. The liquid 1020 solidifies to provide columns 1030 having the predetermined particle concentration profile. In an embodiment, the solidification is done by polymerization or by cooling of the liquid. In one embodiment, the liquid is a plastic monomer which is then polymerized.

FIG. 10K illustrates an exemplary column manufacturing device 1092 having a cast 1000 with columns 1030 as viewed from the side, according to one embodiment. The liquid 1020 solidifies to provide columns 1030 having the predetermined particle concentration profile.

FIG. 10L illustrates an exemplary column manufacturing device 1092 having a cast 1000 with columns 1030 as viewed from the top, according to one embodiment. The liquid 1020 solidifies to provide columns 1030 having the predetermined particle concentration profile.

Figure 11:
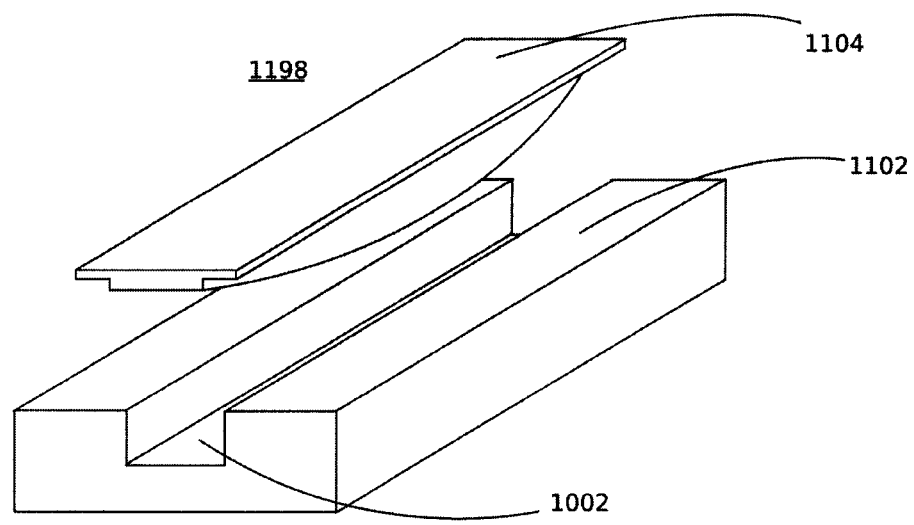
FIG. 11 illustrates a block diagram of an exemplary process for manufacturing a varying thickness column shaped solid, according to one embodiment.

FIG. 11 illustrates a block diagram of an exemplary variable thickness column manufacturing device 1198, according to an embodiment. The cast 1102 represents a single channel. Liquid comprising a particular concentration of particles is poured in to the column 1102. An insert 1104 is placed on the channel 1102. The curved shape of the insert 1104 is varied so as to render the required shape of the eventual solid that forms. The liquid eventually solidifies giving a varying thickness column shaped solid, the shape of which is determined by the insert 1104.

Uses

The present invention relates to manufacturing of sheets with varying concentration of particles. Described below is one use of such sheets as transparent sources of light. Also disclosed is the concentration profile of the particles for such use. Transparent sheets with the required concentrations of particles can be produced. For achieving the transparency of the sheet, a transparent adhesive material is used. Such transparent adhesive materials are also known as optical cements. Other methods of fusing, including fusing by heat or by dissolution may be used without affecting transparency of the final product.

FIG. 12A illustrates a block diagram of an exemplary transparent light source 1299, according to one embodiment. Light source 1299 is primarily transparent and may have a light guide 1206 with a core 1204 surrounded by low index cladding sheets 1203 and 1205. The core 1204 includes a diffuser, which is a sparse distribution of light dispersing particles. The diffuser in the core 1204 is made up of metallic, organic, or other powder, or pigment, which reflects light incident on it. Alternatively, the diffuser in the core 1204 may be constituted of small transparent particles or bubbles, which disperse light by refraction, reflection at the boundary, by diffusion inside the particle, or by total internal reflection. Linear light source 1202 illuminates the light guide 1206 from bottom edge 1207. Top edge 1208 does not have a reflective surface. Reflector 1201 concentrates light from the linear light source 1202 into the light guide 1206. The light from a primary light source 1202 is dispersed over the entire surface of the light guide 1206 and exits from its large faces. The light guide 1206 is thus primarily transparent and clear when viewed from one of its faces.

FIG. 12B illustrates a block diagram of an exemplary transparent light source 1299 as viewed from the side, according to one embodiment. Light source 1299 is primarily transparent and has a core 1204 surrounded by low index cladding sheets 1203 and 1205. The core 1204 includes a diffuser, which is a sparse distribution of light dispersing particles. The diffuser in the core 1204 is made up of metallic, organic, or other powder, or pigment, which reflects light incident on it. Alternatively, the diffuser in the core 1204 may be constituted of small transparent particles or bubbles, which disperse light by refraction, reflection at the boundary, by diffusion inside the particle, or by total internal reflection. Linear light source 1202 illuminates the light guide from bottom edge 1207. Reflector 1201 concentrates light from the linear light source 1202 into the core 1204.

Figure 13:
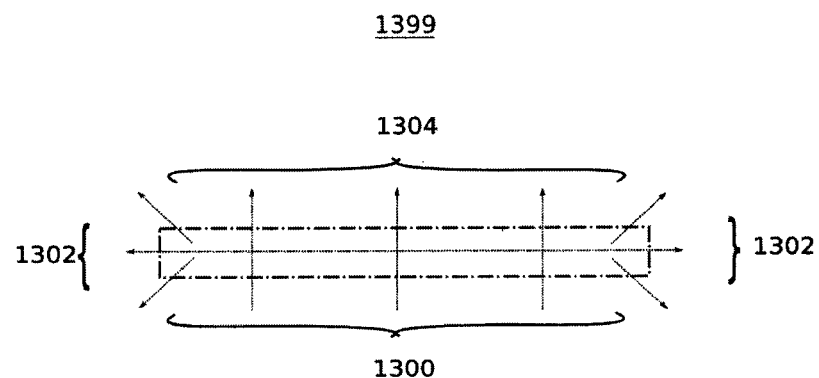
FIG. 13 illustrates a block diagram of an exemplary element of core of exemplary light source in the form of a surface, according to one embodiment.

FIG. 13 illustrates a block diagram of an exemplary core element 1399 of core 1304 of a light source in the form of a surface, according to one embodiment. Core element 1399 has the thickness and breadth of the core 1304 but has a very small height. Light 1300 enters element 1399. Some of the light gets dispersed and leaves the light guide as illumination light 1302, and the remaining light 1304 travels on to the next core element. The power of the light 1300 going in is matched by the sum of the powers of the dispersed light 1302 and the light continuing to the next core element 1304. The fraction of light dispersed 1302 with respect to the light 1300 entering the core element 1399 is the photic dispersivity of core element 1399. The photic dispersivity of core element 1399 is in direct proportion to the height of element 1399. The ratio of the photic dispersivity of core element 1399 to the height of core element 1399 is the photic dispersion density of element 1399. As the height of core element 1399 decreases, the photic dispersion density approaches a constant. This photic dispersion density of core element 1399 bears a certain relationship to the diffuser concentration at the core element 1399. The relationship is approximated to a certain degree as a direct proportion. The relationship permits the evaluation of the photic dispersion density of core element 699 from the diffuser concentration of that element, and vice versa.

As the height of core element 1399 is reduced, power in the emanating light 1302 reduces proportionately. The ratio of power of the emanating light 1302 to the height of core element 1399 that approaches a constant as the height of the element is reduced, is the emanated power density at element 1399. The emanated power density at element 1399 is the photic dispersion density times the power of the incoming light (i.e. power of light traveling through the element). The gradient of the power of light traveling through the element 1399 is the negative of the emanated power density. These two relations give a differential equation. This equation can be represented in the form "dP/dh=−qP=−K" where:

h is the height of a core element from the primary light source edge 1207

P is the power of the light being guided through that element;

q is the photic dispersion density of the element; and

K is the emanated power density at that element.

This equation is used to find the emanated power density given the photic dispersion density at each element. This equation is also used to find the photic dispersion density of each element, given the emanated power density. To design a particular light source in the form of a surface with a particular emanated power density, the above differential equation is solved to determine the photic dispersion density at each element of the light source, such as the light source 1299. From this, the diffuser concentration at each core element of the core is determined. Such a core is used in a light guide, to give a light source of required emanated energy density over the surface of the light source.

If a uniform concentration of diffuser is used in the core, the emanated power density drops exponentially with height. Uniform emanated power density may be approximated by choosing a diffuser concentration such that the power drop from the edge near the light source (such as edge 1207) to the opposite edge 1208, is minimized. To reduce the power loss and also improve the uniformity of the emanated power, opposite edge reflects light back into the core. In an alternate embodiment, another light source sources light into the opposite edge.

To achieve uniform illumination, the photic dispersion density and hence the diffuser concentration has to be varied over the length of the core. This can be done using the above methodology. The required photic dispersion density is q=K/(A−hK), where A is the power going into the linear light source 1304 and K is the emanated power density at each element, a constant number for uniform illumination. If the total height of the linear light source is H, then H times K should be less than A, i.e. total power emanated should be less than total power going into the light guide, in which case the above solution is feasible. If the complete power going into the light guide is utilized for illumination, then H times K equals A. In an exemplary light source, H times K is kept only slightly less than A, so that only a little power is wasted, as well as photic dispersion density is always finite.

Figure 14:
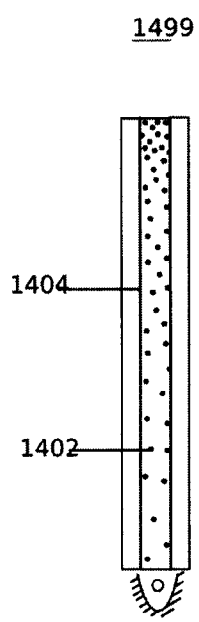
FIG. 14 illustrates a diagram of an exemplary light source in the form of a surface having a varied concentration of diffuser particles, according to one embodiment.

FIG. 14 illustrates a diagram of an exemplary light source in the form of a surface 1499 with a core having a varied concentration of diffuser particles, according to one embodiment. The concentration of the diffuser 1402 is varied from sparse to dense from the light source end of linear light source column 1404 to the opposite edge of core 1204.

Figure 15:
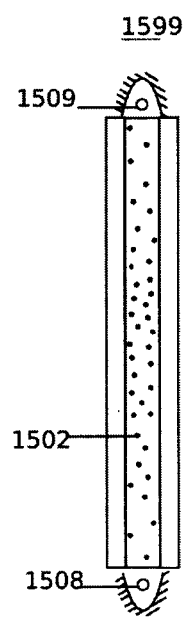
FIG. 15 illustrates an exemplary light source in the form of a surface having two light sources, according to one embodiment.

FIG. 15 illustrates an exemplary light source 1599 in the form of a surface having two light sources 1508, 1509, according to one embodiment. By using two light sources 1508, 1509, high variations in concentration of diffuser particles 1502 in the core is not necessary. The differential equation provided above is used independently for deriving the emanated power density due to each of the light sources 1508, 1509. The addition of these two power densities provides the total light power density emanated at a particular core element.

Uniform illumination for light source 1599 is achieved by photic dispersion density $q=1/\text{sqrt}((h-H/2)^2+C/K^2)$ where sqrt is the square root function, ^ stands for exponentiation, K is the average emanated power density per light source (numerically equal to half the total emanated power density at each element) and C=A(A−HK).

Figure 16:
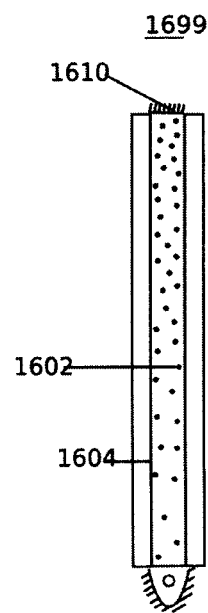
FIG. 16 illustrates a diagram of an exemplary light source in the form of a surface having a mirrored core, according to one embodiment.

FIG. 16 illustrates a diagram of an exemplary light source in the form of a surface 1699 having a mirrored core 1604, according to one embodiment. By using a mirrored core 1604, high variations in concentration of diffuser 1602 in the core 1604 is not necessary. Top edge of the core 1610 is mirrored, such that it will reflect light back into the core 1604. The photic dispersion density to achieve uniform illumination in light source 1699 is:

$$q=1/\text{sqrt}((h-H)^2+D/K^2)$$

where D=4A(A−HK).

For any system described above (such as the light sources in the form of surfaces 1499, 1599 and 1699), the same pattern of emanation is sustained even if the light source power changes. For example, if the primary light source of light source 1499 provides half the rated power, each element of the core will emanate half its rated power. Specifically, a light guide core designed to act as a uniform light source as a uniform light source at all power ratings by changing the power of its light source or sources. If there are two light sources, their powers are changed in tandem to achieve this effect.

Multi-Colored Illuminator

Figure 17:
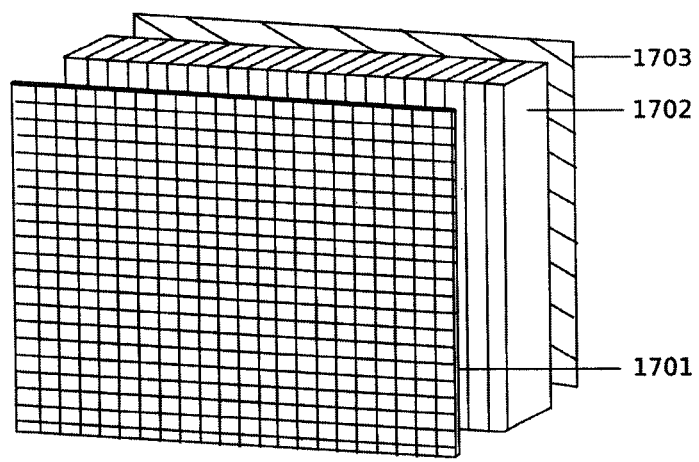
FIG. 17 illustrates a diagram of an exemplary multi-colored backlit system, according to one embodiment.

FIG. 17 illustrates a multi-colored backlit system 1799, according to one embodiment. A multi-colored illuminator system comprises a backlight such that each pixel column of the backlit display is illuminated by light of a particular color. The light illuminating different pixel columns may be of different colors. The columnar light sources 1702 provide illumination for the display. Mirror 1703 is placed behind the columnar light sources 1702. Liquid crystal matrix 1701 is placed in front of the columnar light sources 1702.

Figure 18A:
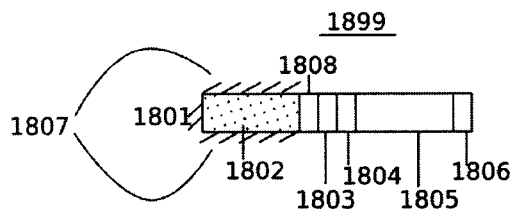
FIG. 18A illustrates a block diagram of an exemplary column of a multicolor backlit display system as viewed from the top, according to one embodiment.

FIG. 18A illustrates a block diagram of an exemplary column 1899 of an exemplary multicolor backlit display system as viewed from the top, according to one embodiment. Polarizer 1806, liquid crystal 1805 and polarizer 1804 together form a light valve that modulates the intensity of light passing through it. Illuminator column 1802 and cladding sheet 1803 together form a waveguide, illuminator 1802 having higher refractive index than cladding sheet 1803. Color filter 1808 is placed in front of the cladding sheet 1803. Illuminator 1802 has a small concentration of light dispersing particles. Light inside the waveguide undergoes continuous total internal reflection. Back-mirror 1801 reflects light from the back surface. Side-mirrors 1807 reflect light from the side surfaces. Side-mirrors 1807 prevent light from leaking into the adjacent columns. The mirrors 1801 and 1807 may be any reflector, including metallic surfaces, distributed Bragg reflectors, hybrid reflectors, total internal reflectors, omni-direction reflectors or scattering reflectors.

Figure 18B:
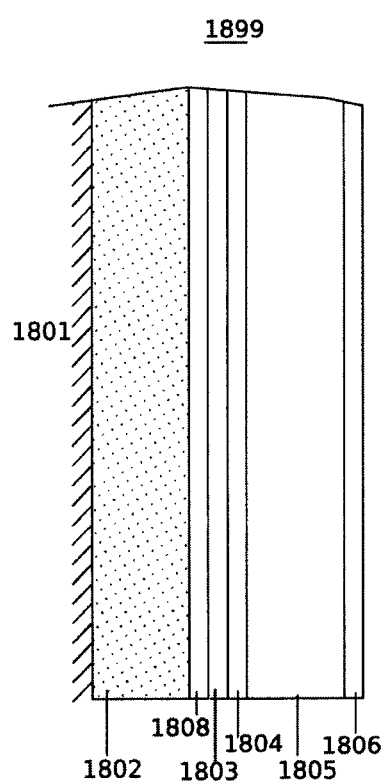
FIG. 18B illustrates a block diagram of an exemplary column of a multi-colored backlit display system as viewed from the front, according to one embodiment.

FIG. 18B illustrates a block diagram of an exemplary column 1899 of an exemplary multi-colored backlit display system as viewed from the front, according to one embodiment. Polarizer 1806, liquid crystal 1805 and polarizer 1804 together form a light valve that modulates the intensity of light passing through it. Illuminator column 1802 and cladding sheet 1803 together form a waveguide, illuminator 1802 having higher refractive index than cladding sheet 1803. Color filter 1808 is placed in front of the cladding sheet 1803. Illuminator 1802 has a small concentration of light dispersing particles. Light inside the waveguide undergoes continuous total internal reflection. Back-mirror 1801 reflects light from the back surface. Side-mirrors 1807 reflect light from the side surfaces. Side-mirrors 1807 prevent light from leaking into the adjacent columns.

Figure 18C:
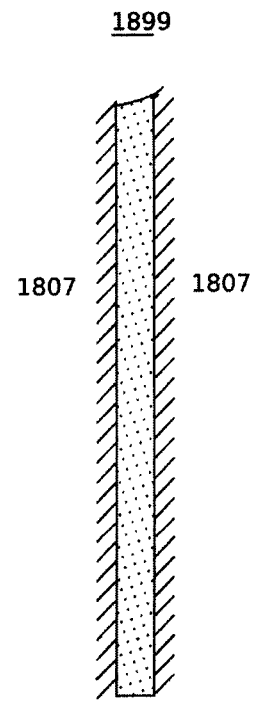
FIG. 18C illustrates a block diagram of an exemplary column of a backlit display system as viewed from the side, according to one embodiment.

FIG. 18C illustrates a block diagram of an exemplary column 1899 of an exemplary backlit display system as viewed from the side, according to one embodiment. Side-mirrors 1807 prevent light from leaking into the adjacent columns.

Figure 19:
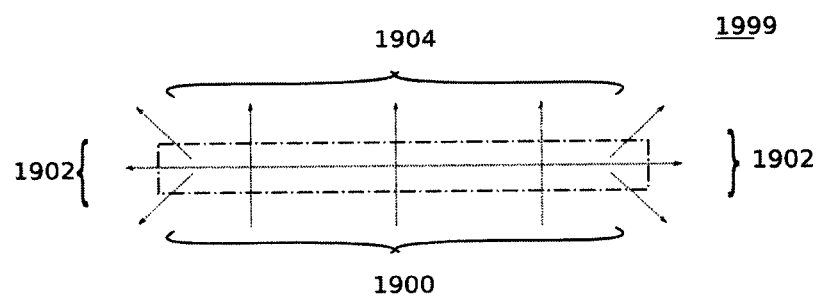
FIG. 19 illustrates a block diagram of an exemplary element of an illuminator column, according to one embodiment.

FIG. 19 illustrates a block diagram of an exemplary core element 1999 of the illuminator column 1802. Core element 1999 has a very small height. Light 1900 enters core element 1999. Some of the light gets dispersed and leaves the light guide as illumination light 1902, and the remaining light 1904 travels on to the next illuminator column element. As has been discussed in conjunction with the core element 1399 in FIG. 13, the differential equation pertaining to the columnar source relating the power (P) of light being guided through the core element 1999, the height (h) of the element and the photic dispersion density (q) of the element is represented as "dP/dh=−qP=−K" where K is the emanated power density at that core element 1999.

If a uniform concentration of diffuser is used in the illuminator, the emanated power density drops exponentially with height. Uniform emanated power density may be approximated by choosing a diffuser concentration such that the power drop from the end near the light source to the opposite end, is minimized. To reduce the power loss and also improve the uniformity of the emanated power, opposite end reflects light back into the illuminator column. In an alternate embodiment, another light source sources light into the opposite end.

To achieve uniform illumination, the photic dispersion density and hence the diffuser concentration has to be varied over the illuminator surface. This can be done using the above methodology. The required photic dispersion density is q=K/(A−hK), where A is the power going into the illuminator column 1802 and K is the emanated power density at each element, a constant number for uniform illumination. If the total height of the illuminator is H, then H times K should be less than A, i.e. total power emanated should be less than total power going into the light guide, in which case the above solution is feasible. If the complete power going into the light guide is utilized for illumination, then H times K equals A. In one exemplary column, H times K is kept only slightly less than A, so that only a little power is wasted, as well as photic dispersion density is always finite.

Figure 20:
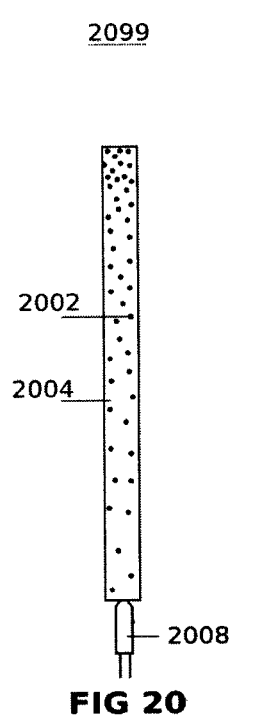
FIG. 20 illustrates a diagram of an illuminator column having a varied concentration of diffuser particles, according to one embodiment.

FIG. 20 illustrates a diagram of an illuminator column 2099 having a varied concentration of diffuser particles, according to one embodiment. The concentration of the diffuser 2002 is varied from sparse to dense from the light source end of illuminator column 2004 to the opposite end. Light source 2008 provides light to illuminator column 2004.

Figure 21:
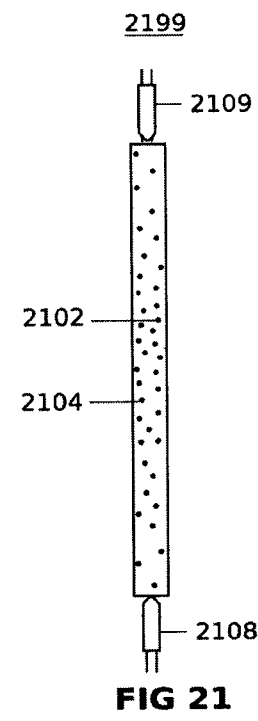
FIG. 21 illustrates an exemplary illuminator column having two light sources, according to one embodiment.

FIG. 21 illustrates an exemplary illuminator column 2199 having two light sources 2108, 2109, according to one embodiment. By using two light sources 2108, 2109, high variations in concentration of diffuser 2102 in the illuminator column 2104 is not necessary. The differential equation provided above is used independently for deriving the emanated power density due to each of the light sources 2108, 2109. The addition of these two power densities provides the total light power density emanated at a particular core element.

Uniform illumination for light source 2199 is achieved by photic dispersion density q=1/sqrt((h−H/2)^2+C/K^2) where sqrt is the square root function, ^ stands for exponentiation, K is the average emanated power density per light source (numerically equal to half the total emanated power density at each element) and C=A(A−HK).

Figure 22:
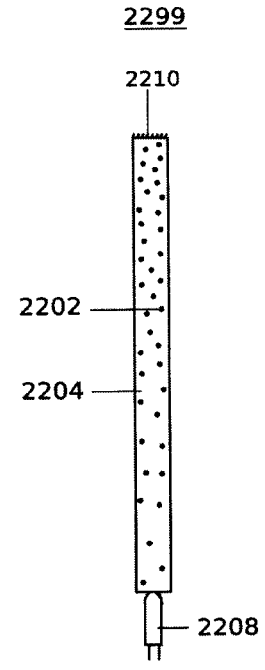
FIG. 22 illustrates a diagram of an exemplary mirrored illuminator column, according to one embodiment.

FIG. 22 illustrates a diagram of an exemplary mirrored illuminator column 2299. By using a mirrored illuminator 2204, high variations in concentration of diffuser 2202 in the core 2204 are not necessary. Light source 2208 provides light to illuminator column 2204. Top end 2210 of the central illuminator column 2204 is mirrored, such that it reflects light back into central illuminator column 2204. The photic dispersion density to achieve uniform illumination in light source 2299 is:

q=1/sqrt((h−H)^2+D/K^2)

where D=4A(A−HK).

For any system (such as the light sources in the form of surfaces 2099, 2199 and 2299), the same pattern of emanation is sustained even if the light source power changes. For example, if the light source of illuminator column 1899 provides half the rated power, each element of the core will emanate half its rated power. Specifically, a light guide core designed to act as a uniform illuminator acts as a uniform illuminator at all power ratings by changing the power of its light source or sources. If there are two light sources, their powers are changed in tandem to achieve this effect.

An apparatus and method of manufacturing sheets with varying concentrations of particles have been described. It is understood that the embodiments described herein are for the purpose of elucidation and should not be considered limiting the subject matter of the present patent. Various modifications, uses, substitutions, recombinations, improvements, methods of productions without departing from the scope or spirit of the present invention would be evident to a person skilled in the art.

We claim:

1. A method, comprising:
   manufacturing an apparatus comprising a first sheet and a light source disposed near an edge of the first sheet comprising,
   manufacturing a first sheet comprising particles, from a second sheet and a third sheet,
   the concentration of particles in the first sheet being uniform through the entire thickness direction of the first sheet at any location on the first sheet and the concentration of particles continuously varying across the entire width and/or the entire length of the first sheet;
   providing the second sheet having a second concentration of particles and a first shape with varying thickness,
   providing the third sheet having a third concentration of particles and a second shape with varying thickness, and
   merging the second sheet and the third sheet along curved surfaces of the second sheet and the third sheet to generate the first sheet; wherein
   the second sheet is merged to the third sheet by fusion, which comprises physical diffusion of the particles from the second sheet into the third sheet;
   the physical diffusion is strong enough to cause a local homogenization of the concentration of the particles of the first sheet without causing the homogenization of the concentration of the particles over the whole of the first sheet; and
   the local homogenization comprises homogenization spanning the thickness of the first sheet.

2. The method of claim 1, wherein the second sheet is in a liquid state when merged with the third sheet.

3. The method of claim 2, wherein the third sheet is not in a liquid state, the third sheet dissolves in the second sheet due to heat and further comprises solidifying the second sheet.

4. The method of claim 3, wherein solidifying the second sheet comprises cooling the second sheet.

5. The method of claim 2, further comprising solidifying the second sheet through polymerization.

6. The method of claim 1, further comprising controlling a rate of the physical diffusion and a time period such that the physical diffusion occurs.

7. The method of claim 6, wherein controlling the rate of physical diffusion comprises controlling a viscosity of the second sheet while in a liquid state.

8. The method of claim 1, wherein the physical diffusion of the particles from the second sheet creates the continuously varying concentration of particles in the first sheet.

9. The method of claim 1, wherein before the step of merging, the second sheet is an unending sheet provided using a continuous process.

10. The method of claim 9, wherein merging the second sheet comprises merging the second sheet using a continuous process.

11. The method of claim 1, wherein the second sheet is provided by casting the second sheet in a mold.

12. The method of claim 1, wherein the second concentration of particles and the third concentration of particles are chosen in such a way that after the physical diffusion the required first continuously varying concentration of particles is obtained.

13. The method of claim 1, wherein the first sheet has no exposed curved surfaces.

14. The method of claim 1, wherein the particles in the second sheet and particles in the third sheet are of the same kind.

15. The method of claim 1, wherein both the second sheet and the third sheet contain particles.

16. The method of claim 1, wherein the local homogenization is such that in a region of the first sheet extending completely into the thickness and breadth of the first sheet, but having a very small height compared to the first sheet, the concentration of particles is substantially uniform.

17. A method, comprising,
   manufacturing a first sheet having a plurality of first columnar bodies, each first columnar body having particles, the concentration of particles in each first columnar body being uniform through the entire thickness direction of that first columnar body at any location on that first columnar body and the concentration of particles continuously varying across the entire length of that first columnar body;
   providing multiple second columnar bodies, each having a particular concentration of particles, and varying thickness,
   providing multiple third columnar bodies, each having a particular concentration of particles, and varying thickness, and
   merging the multiple second columnar bodies and the multiple third columnar bodies to produce the plurality of first columnar bodies; wherein
   the multiple second columnar bodies are merged to the multiple third columnar bodies by fusion, which comprises physical diffusion of the particles from the multiple second columnar bodies into the multiple third columnar bodies;
   a columnar body is a body extended primarily in one direction; and
   each first columnar body is a waveguide capable of conducting light along its length.

* * * * *